(12) United States Patent
Lin et al.

(10) Patent No.: US 11,579,659 B2
(45) Date of Patent: Feb. 14, 2023

(54) ELECTRONIC DEVICE

(71) Applicants: Che-Hsien Lin, Taipei (TW); Ko-Yen Lu, Taipei (TW)

(72) Inventors: Che-Hsien Lin, Taipei (TW); Ko-Yen Lu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 223 days.

(21) Appl. No.: 17/070,916

(22) Filed: Oct. 14, 2020

(65) Prior Publication Data

US 2021/0200279 A1 Jul. 1, 2021

Related U.S. Application Data

(60) Provisional application No. 62/953,907, filed on Dec. 26, 2019.

(51) Int. Cl.
*G06F 1/16* (2006.01)
(52) U.S. Cl.
CPC .................. *G06F 1/1681* (2013.01)
(58) Field of Classification Search
None
See application file for complete search history.

(56) References Cited

U.S. PATENT DOCUMENTS

| 8,018,715 B2 * | 9/2011 | Chang | G06F 1/1647 |
| | | | 361/679.04 |
| 10,477,716 B2 * | 11/2019 | Zhang | G06F 1/1641 |
| 2007/0247798 A1 * | 10/2007 | Scott, II | G06F 1/1647 |
| | | | 361/679.04 |
| 2010/0124008 A1 * | 5/2010 | Chang | G06F 1/1616 |
| | | | 361/679.26 |
| 2021/0064084 A1 * | 3/2021 | Lin | G06F 1/1681 |

FOREIGN PATENT DOCUMENTS

| CN | 101133628 | 2/2008 |
| CN | 101394431 | 3/2009 |
| CN | 105635371 | 6/2016 |
| TW | 200823677 | 6/2008 |
| TW | M394678 | 12/2010 |

OTHER PUBLICATIONS

"Office Action of Taiwan Counterpart Application", dated May 11, 2021, pp. 1-10.
"Office Action of China Counterpart Application", dated Oct. 22, 2021, p. 1-p. 9.

* cited by examiner

*Primary Examiner* — Anthony Q Edwards
*Assistant Examiner* — Rashen E Morrison
(74) *Attorney, Agent, or Firm* — JCIPRNET

(57) ABSTRACT

An electronic device is provided, including at least one body, at least one functional assembly, and at least one elastic positioning assembly. The functional assembly is slidably disposed on the body along a sliding direction. The elastic positioning assembly is disposed on the body and adapted to prop the functional assembly along a direction perpendicular to the sliding direction, so that a gap is formed between the functional assembly and the body. When the functional assembly slides to a predetermined position with respect to the body, the elastic positioning assembly provides a positioning force to the functional assembly along a direction parallel to the sliding direction.

13 Claims, 9 Drawing Sheets

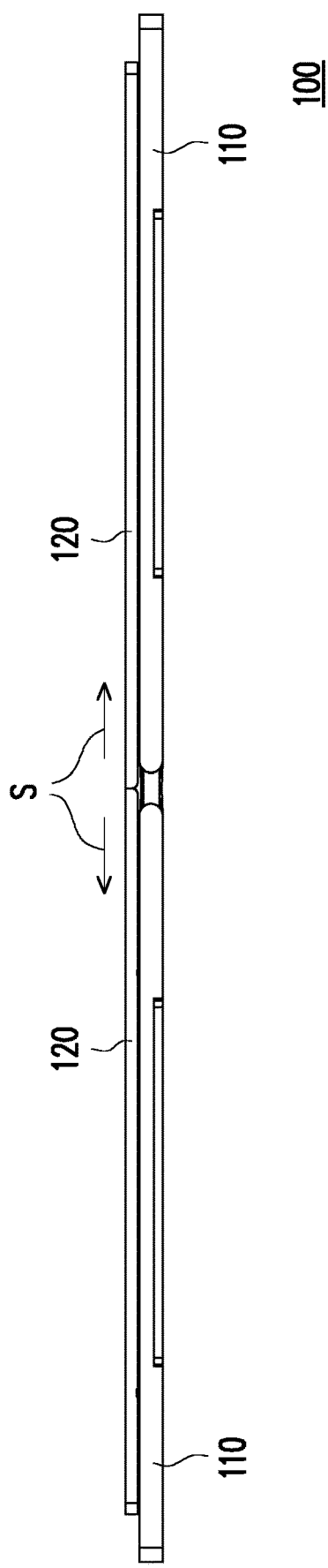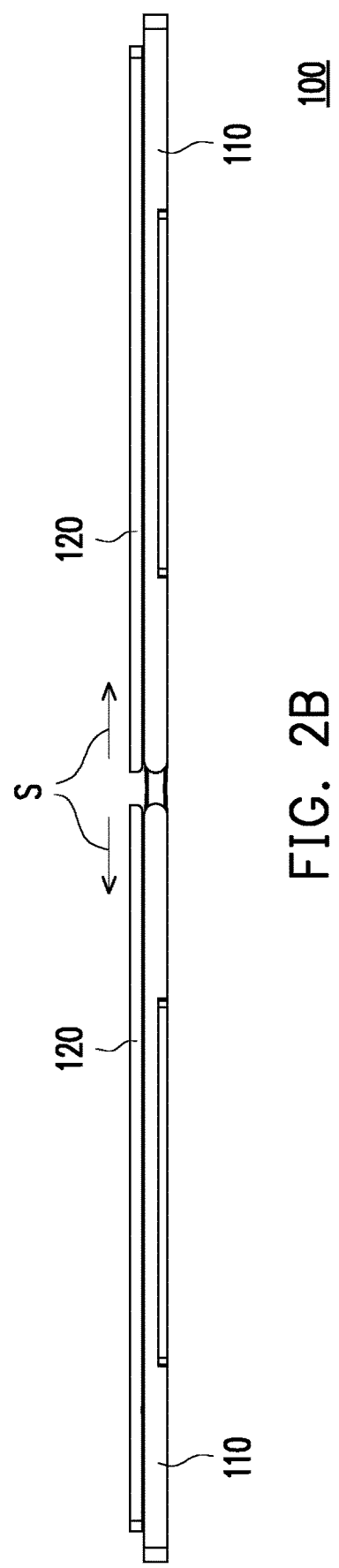

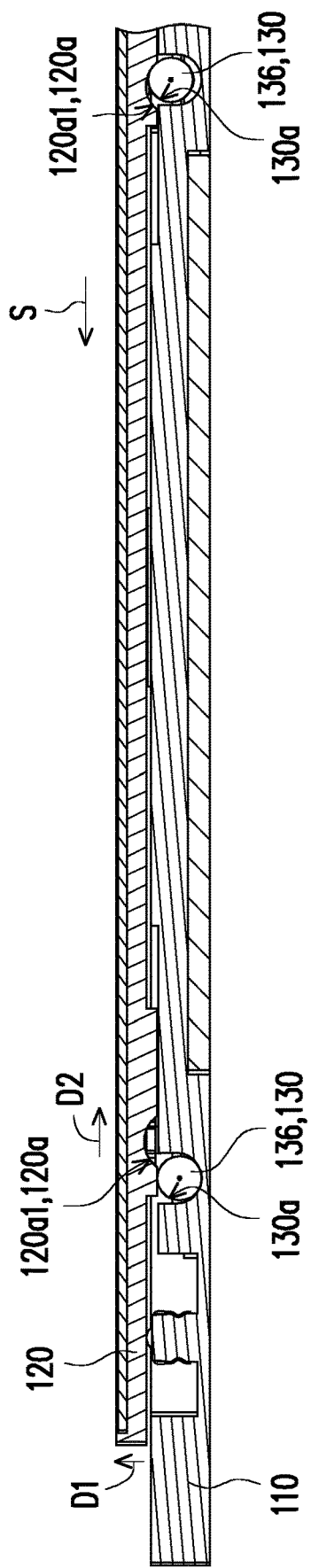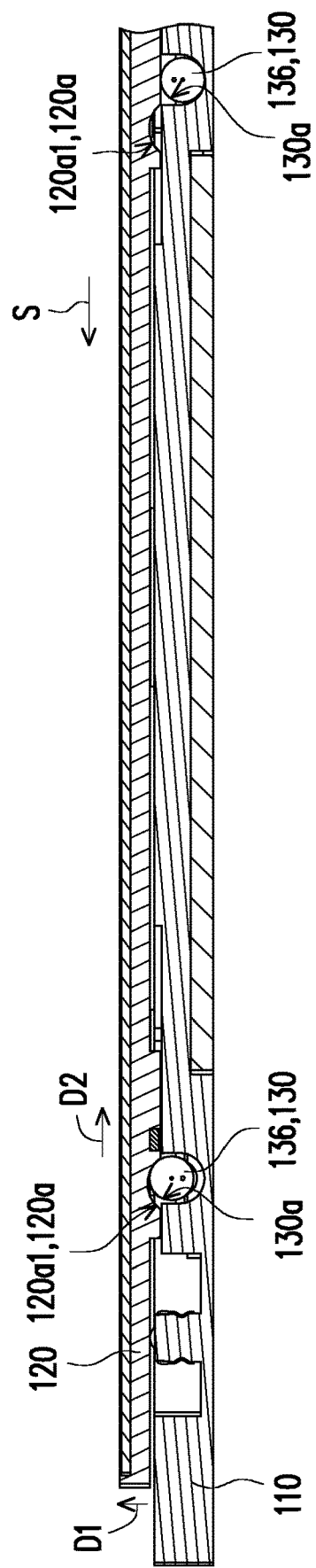

ELECTRONIC DEVICE

CROSS-REFERENCE TO RELATED APPLICATION

This application claims the priority benefit of U.S. provisional application Ser. No. 62/953,907, filed on Dec. 26, 2019. The entirety of the above-mentioned patent application is hereby incorporated by reference herein and made a part of this specification.

BACKGROUND

Technical Field

The disclosure relates to an electronic device; particularly, the disclosure relates to an electronic device that includes a slidable functional assembly.

Description of Related Art

With the popularization and development of notebook computers, consumers are demanding increasingly for the convenience and versatility of operation thereof. In some notebook computers, two bodies are both provided with display panels and are in a form of dual screens, and the two bodies can be flipped by 180 degrees with respect to each other to be flattened. In order for the relative positions of the two display panels to be changed in accordance with the flip angle of the two bodies, the display panel is designed to be slidable along the corresponding body in some notebook computers. However, it is likely that the display panel does not slide smoothly due to friction with the body during sliding, and that the display panel does not slide smoothly due to assembly tolerances between the components. In addition, the assembly tolerances between the components also cause the display panel to be unable to be reliably positioned after being slid in place, which results in unexpected inclination or deviation.

SUMMARY

The disclosure provides an electronic device of which a functional assembly can slide smoothly and stably along a body and can be reliably positioned.

The electronic device of the disclosure includes at least one body, at least one functional assembly, and at least one elastic positioning assembly. The functional assembly is slidably disposed on the body along a sliding direction. The elastic positioning assembly is disposed on the body and is adapted to prop the functional assembly along a direction perpendicular to the sliding direction so that a gap is formed between the functional assembly and the body. When the functional assembly slides to a predetermined position with respect to the body, the elastic positioning assembly provides a positioning force to the functional assembly along a direction parallel to the sliding direction.

In an embodiment of the disclosure, the number of the body is two, and the two bodies are pivotally connected to each other. The number of the functional assembly is two, and the two functional assemblies respectively correspond to the two bodies.

In an embodiment of the disclosure, each of the functional assemblies is adapted to slide along the corresponding body as the two bodies pivotally rotate with respect to each other.

In an embodiment of the disclosure, when the two functional assemblies become coplanar as the two bodies expand with respect to each other and when each of the functional assemblies is located at the predetermined position, an edge of each of the functional assemblies abuts against an edge of the other functional assembly.

In an embodiment of the disclosure, the functional assembly has at least one positioning concave portion, and the positioning concave portion faces toward the body. When the functional assembly is located at the predetermined position, the elastic positioning assembly is positioned at the positioning concave portion.

In an embodiment of the disclosure, the elastic positioning assembly has a convex curved surface, the positioning concave portion has a concave curved surface, and the convex curved surface is adapted to contact the concave curved surface.

In an embodiment of the disclosure, when the functional assembly is located at the predetermined position, a curvature center of the convex curved surface deviates from a curvature center of the concave curved surface in the sliding direction.

In an embodiment of the disclosure, a curvature radius of the concave curved surface is 0.7-2 times a curvature radius of the convex curved surface.

In an embodiment of the disclosure, the positioning concave portion has an inclined inner wall, and the inclined inner wall is inclined with respect to the sliding direction. When the functional assembly is located at the predetermined position, the elastic positioning assembly abuts against the inclined inner wall.

In an embodiment of the disclosure, an inclination angle of the inclined inner wall with respect to the sliding direction is 30-90 degrees.

In an embodiment of the disclosure, the elastic positioning assembly includes a bracket, an elastic arm, and a positioning part. The bracket is connected to the body, the elastic arm is connected between the bracket and the positioning part, and the positioning part is adapted to abut against the functional assembly through an elastic force of the elastic arm.

In an embodiment of the disclosure, the positioning part is a roller, and the roller is sleeved on the elastic arm and takes the elastic arm as a rotating shaft.

In an embodiment of the disclosure, the elastic positioning assembly includes an elastic part and a positioning part. The elastic part is compressibly connected between the body and the positioning part, and the positioning part is adapted to abut against the functional assembly through an elastic force of the elastic part.

In an embodiment of the disclosure, the electronic device further includes at least one prop assembly. The prop assembly is disposed on the body and is adapted to prop the functional assembly along the direction perpendicular to the sliding direction.

In an embodiment of the disclosure, the prop assembly includes a rolling ball and a limiting part. The limiting part is connected to the body and limits a position of the rolling ball to the body.

Based on the foregoing, in the disclosure, the elastic positioning assembly is disposed on the body of the electronic device, so that through propping the functional assembly by the elastic positioning assembly, a gap is formed between the functional assembly and the body. Thereby, it can be prevented that the functional assembly does not slide smoothly due to the friction with the body during the process where the functional assembly slides along the body. Also, the elastic positioning assembly, through the elastic deformation thereof, absorbs the assembly tolerances between the components, which accordingly prevents that the functional assembly propped by the elastic positioning assembly cannot slide smoothly due to the assembly tolerances. In addition, when the functional assembly slides to the predetermined place, the functional assembly is positioned by the elastic positioning assembly through its provided positioning force parallel to the sliding direction. Accordingly, the functional assembly is reliably positioned in the absence of an unexpected inclination or deviation in the sliding direction.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 2A is a side view of the electronic device of FIG. 1A.

FIG. 2B is a side view of the electronic device of FIG. 1B.

FIG. 3A is a partial cross-sectional view of the electronic device of FIG. 2A.

FIG. 3B is a partial cross-sectional view of the electronic device of FIG. 2B.

DESCRIPTION OF THE EMBODIMENTS

Figure 1A:
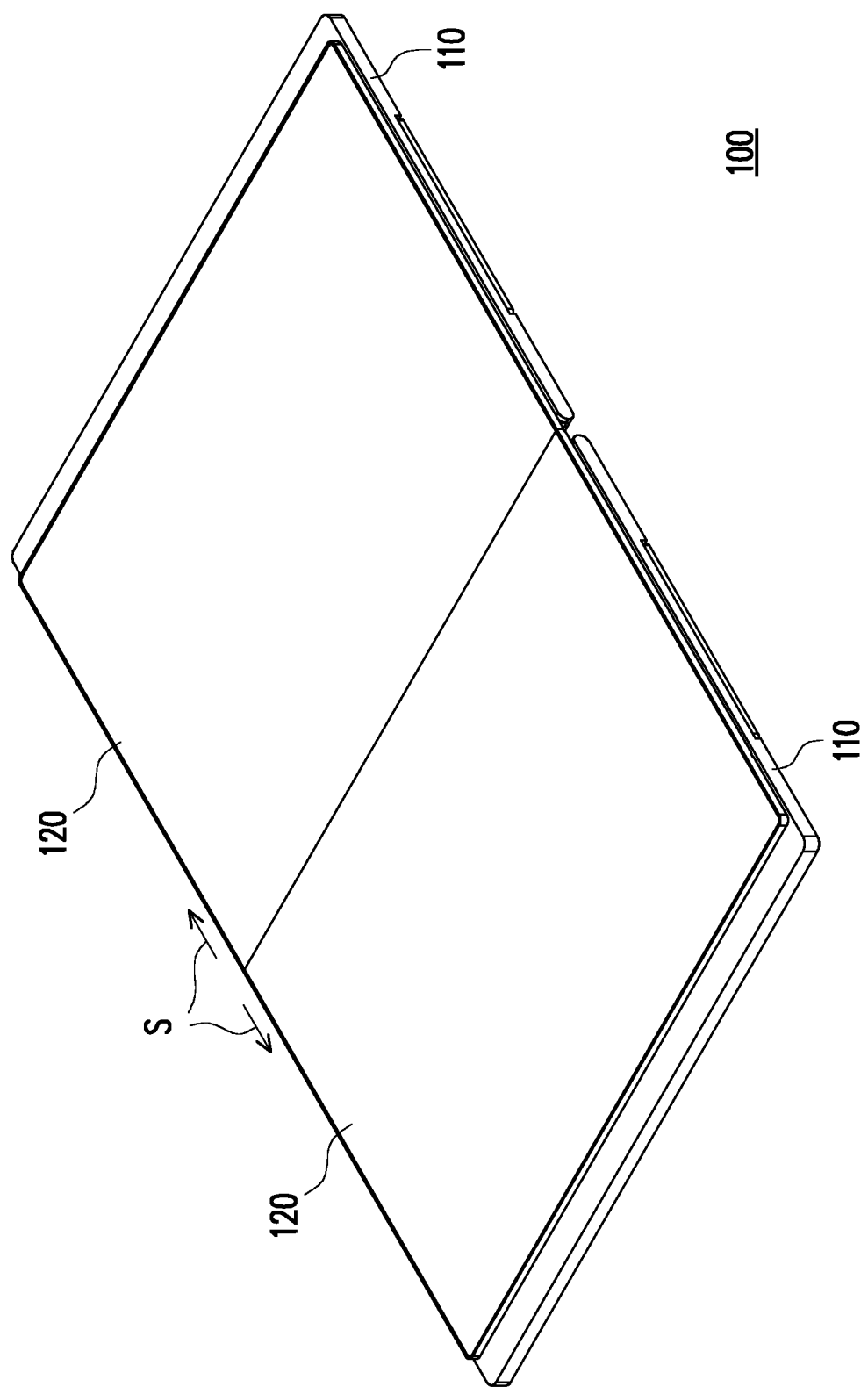
FIG. 1A is a perspective view of an electronic device according to an embodiment of the disclosure.
Figure 1B:
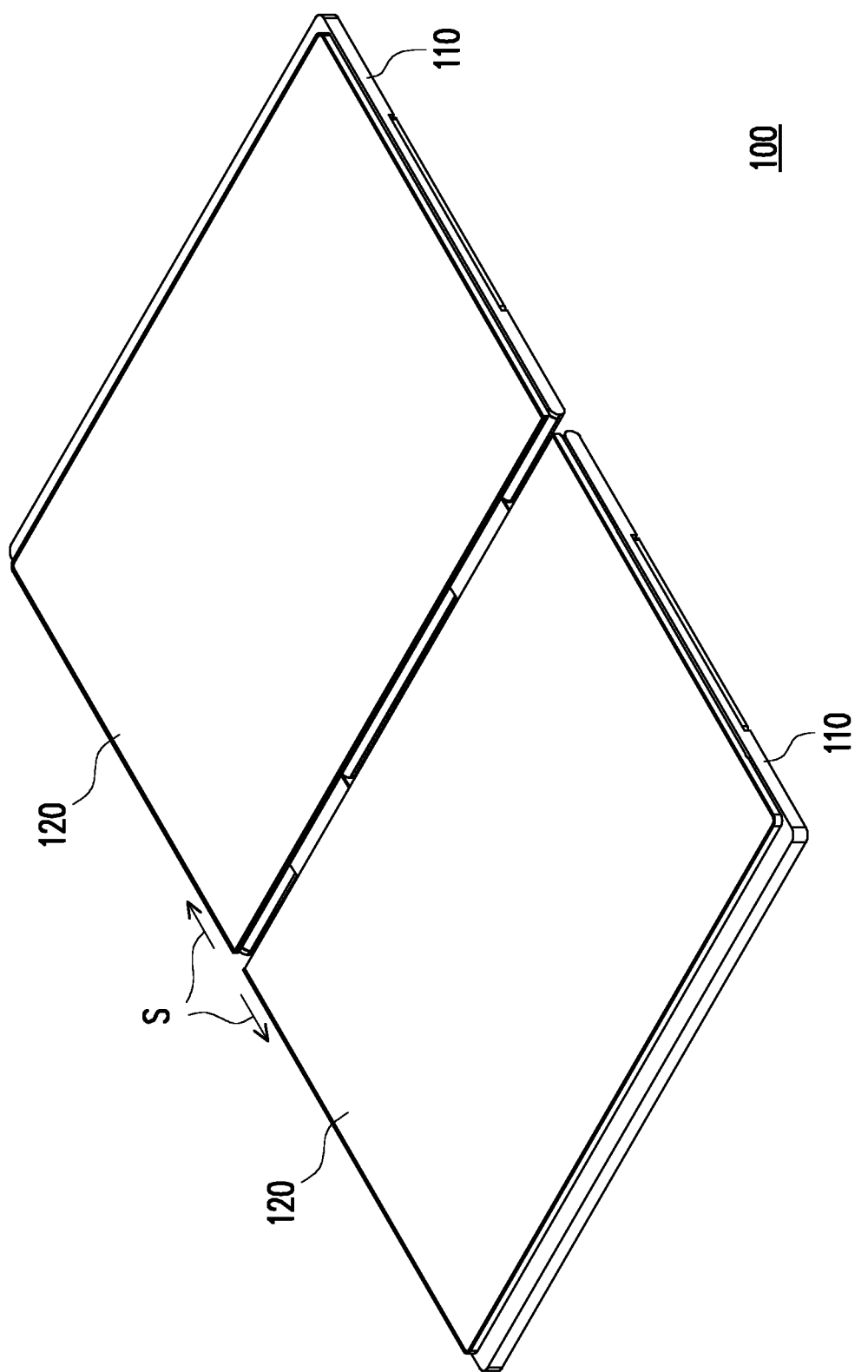
FIG. 1B illustrates a functional assembly of FIG. 1A sliding with respect to the body.

FIG. 1A is a perspective view of an electronic device according to an embodiment of the disclosure. FIG. 1B illustrates a functional assembly of FIG. 1A sliding with respect to the body. FIG. 2A is a side view of the electronic device of FIG. 1A. FIG. 2B is a side view of the electronic device of FIG. 1B. With reference to FIGS. 1A through 2B, an electronic device 100 in this embodiment is, for example, a notebook computer and includes two bodies 110 and two functional assemblies 120. The two bodies 110 are pivotally connected to each other and can be flipped with respect to each other. The two functional assemblies 120 are slidably disposed respectively on the two bodies 110 along a sliding direction S and may slide to a state as shown in FIGS. 1A and 2A to be close to each other and form a continuous display surface, and may slide to a state as shown in FIG. 1B and FIG. 2B to be separated from each other. The two functional assemblies 120 may both be display screens, may respectively be a display screen and an input interface, or may respectively be other types of functional assemblies, which is not limited in the disclosure. The input interface may be a keyboard module, a touchpad, or another input device.

In this embodiment, each functional assembly 120 may be slidably disposed on the corresponding body 110 through a sliding groove, a sliding rail, or another suitable similar structure, which is not limited in the disclosure. In addition, each functional assembly 120 may be slid with respect to the body 110, for example, through manual operation by a user. However, the disclosure is not limited thereto. In other embodiments, each functional assembly 120 may be designed to be linked with a pivot structure between the two bodies 110, so that each functional assembly 120 slides along the corresponding body 110 as the two bodies pivotally rotate with respect to each other.

FIG. 3A is a partial cross-sectional view of the electronic device of FIG. 2A. FIG. 3B is a partial cross-sectional view of the electronic device of FIG. 2B. With reference to FIG. 3A and FIG. 3B, the electronic device 100 in this embodiment further includes a plurality of elastic positioning assemblies 130, each of which is disposed on the body 110. Correspondingly, the functional assembly 120 has a plurality of positioning concave portions 120a facing the body 110, and the positioning concave portions 120a are configured to cooperate with the elastic positioning assemblies 130 to position the functional assembly 120.

Specifically, each elastic positioning assembly 130 has a convex curved surface 130a, and each positioning concave portion 120a has a concave curved surface 120a1. When the functional assembly 120 is located at a predetermined position as shown in FIG. 3A, the convex curved surface 130a of some of the elastic positioning assemblies 130 (e.g., the elastic positioning assembly 130 at the right of FIG. 3A) is in contact with the concave curved surface 120a1 of the corresponding positioning concave portion 120a, so that the elastic positioning assembly 130 is positioned at the corresponding positioning concave portion 120a. When the functional assembly 120 is located at another predetermined position as shown in FIG. 3B, the convex curved surface 130a of some of the elastic positioning assemblies 130 (e.g., the elastic positioning assembly 130 at the left of FIG. 3B) is in contact with the concave curved surface 120a1 of the corresponding positioning concave portion 120a, so that the elastic positioning assembly 130 is positioned at the corresponding positioning concave portion 120a. In this embodiment, a curvature radius of the concave curved surface 120a1 of the positioning concave portion 120a of the functional assembly 120 is, for example, 0.7-2 times a curvature radius of the convex curved surface 130a of the elastic positioning assembly 130. However, the disclosure is not limited thereto.

In addition to a positioning function, each elastic positioning assembly 130 is adapted to prop the functional assembly 120 along a direction D1 perpendicular to the sliding direction S to form a gap between the functional assembly 120 and the body 110. In this way, during the process where the functional assembly 120 slides along the body 110, it is possible to prevent that the functional assembly 120 does not slide smoothly due to friction with the body 110. In addition, through elastic deformation, the elastic positioning assembly 130 absorbs assembly tolerances between the components, which accordingly prevents that the functional assembly 120 propped by the elastic positioning assembly 130 cannot slide smoothly due to the assembly tolerances.

Figure 4:
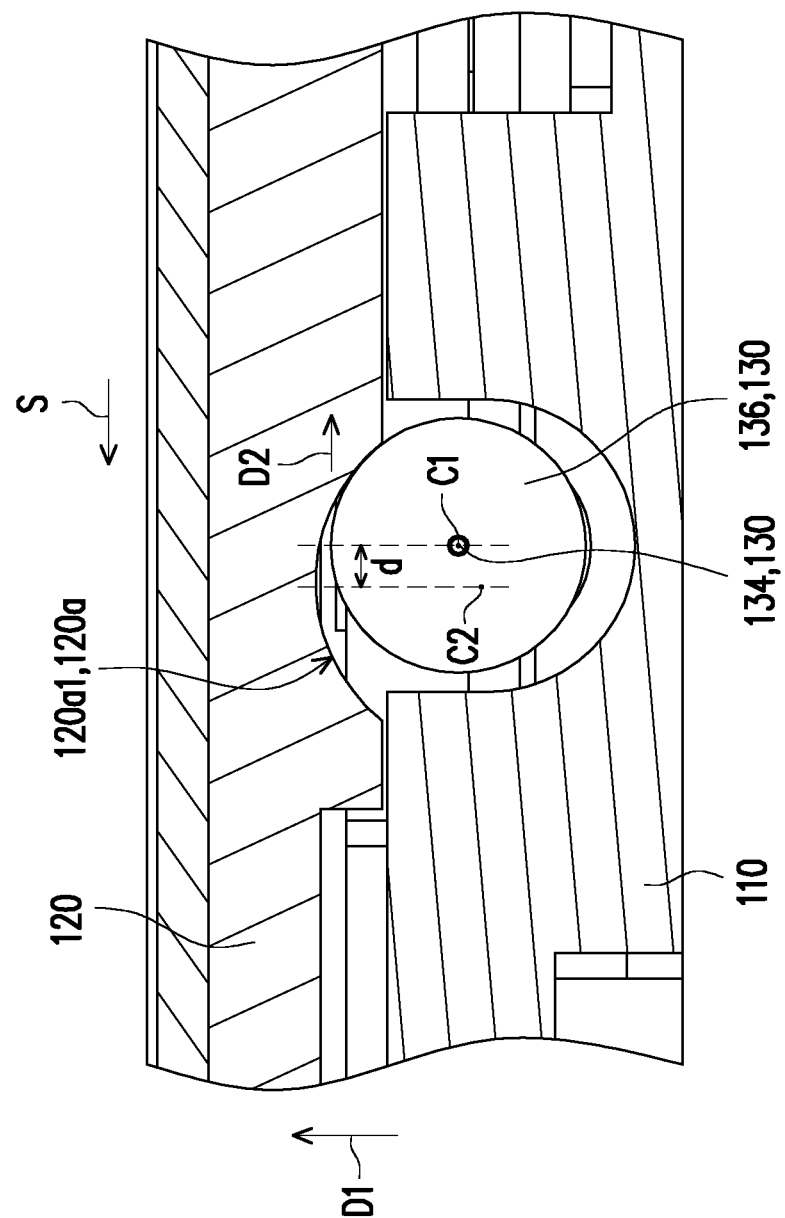
FIG. 4 is a partial enlarged view of the electronic device of FIG. 3A.

FIG. 4 is a partial enlarged view of the electronic device of FIG. 3A. To further explain, when the functional assembly 120 slides to the predetermined position with respect to the body 110, a curvature center C1 of the convex curved surface 130a deviates from a curvature center C2 of the corresponding concave curved surface 120a1 in the sliding direction S as shown in FIG. 4, which is represented by a deviation amount d in FIG. 4, and thereby the convex curved surface 130a tightly abuts a side of the corresponding concave curved surface 120a1. In this way, a force acted on the concave curved surface 120a1 by the elastic positioning assembly 130 positioned at the positioning concave portion 120a includes a component parallel to the sliding direction S, so that the elastic positioning assembly 130 provides a positioning force to the functional assembly 120 along a direction D2 parallel to the sliding direction S. Accordingly, the functional assembly 120 is reliably positioned in the absence of an unexpected inclination or deviation in the sliding direction S.

In this embodiment, when the two functional assemblies 120 become coplanar as the two bodies 110 expand with respect to each other and when each functional assembly 120 is located at the predetermined position as shown in FIG. 1A and FIG. 2A, an edge of each functional assembly 120 abuts against an edge of the other functional assembly 120. At the same time, through the positioning force provided along the direction D2 by the elastic positioning assembly 130 as shown in FIG. 4, the two functional assemblies 120 reliably abuts against each other to be positioned at the predetermined position. Notably, the number of functional assemblies 120 are not limited in the disclosure. In other embodiments, it is possible to dispose only one single functional assembly 120. Moreover, through the positioning force provided by the elastic positioning assembly 130 along the direction D2 as shown in FIG. 4, the functional assembly 120 can be reliably positioned at its extreme position within its sliding range.

Figure 5:
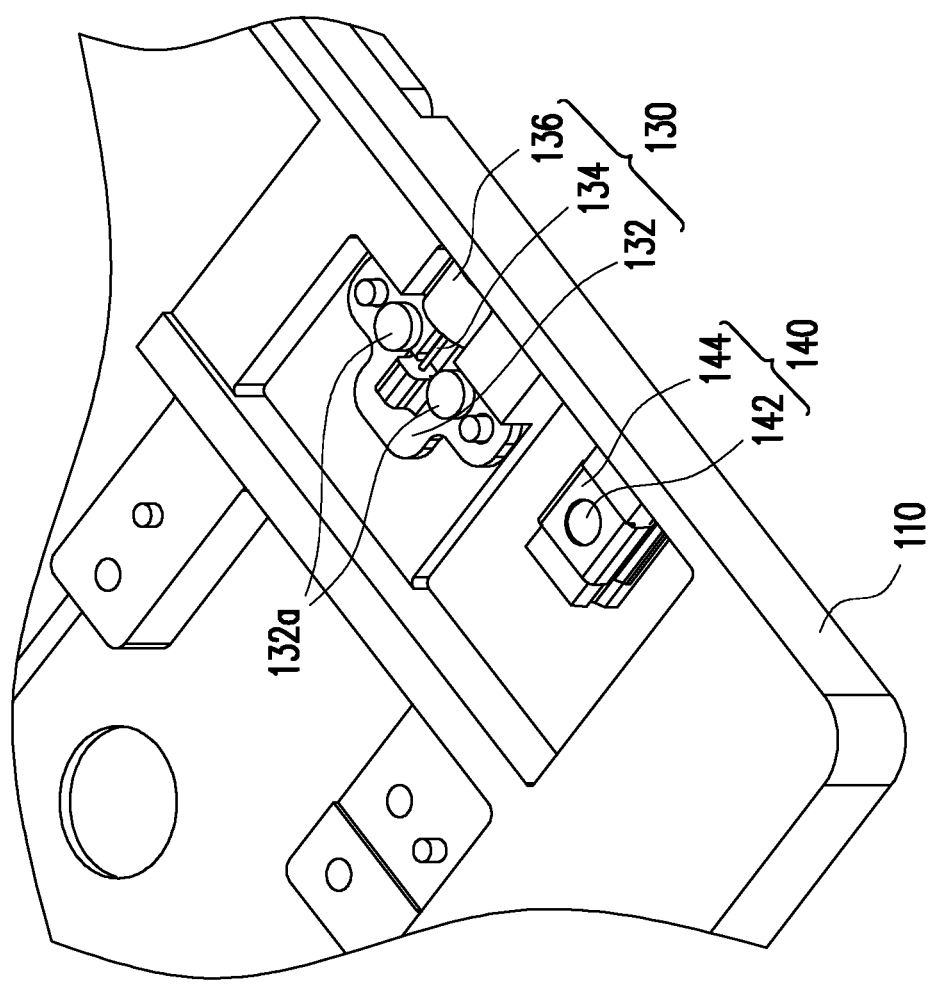
FIG. 5 is a partial perspective view of the electronic device of FIG. 1.
Figure 6:
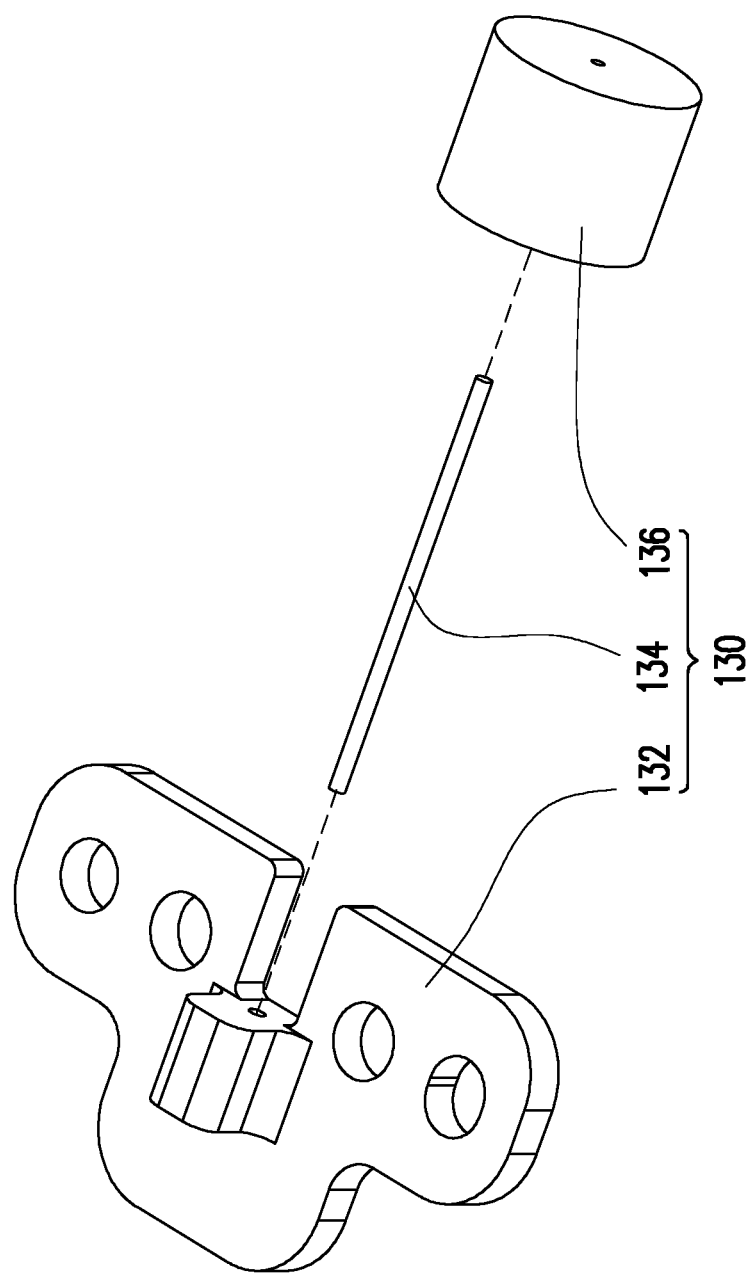
FIG. 6 is an exploded view of the elastic positioning assembly of FIG. 5.

The structure of the elastic positioning assembly in this embodiment will be described in detail below. FIG. 5 is a partial perspective view of the electronic device of FIG. 1. FIG. 6 is an exploded view of the elastic positioning assembly of FIG. 5. With reference to FIG. 5 and FIG. 6, the elastic positioning assembly 130 in this embodiment includes a bracket 132, an elastic arm 134, and a positioning part 136. The bracket 132 is locked and connected to the body 110 through a locking part 132a, and the elastic arm 134 is connected between the bracket 132 and the positioning part 136. The positioning part 136 may abut against the functional assembly 120 (as shown in FIG. 3A and FIG. 3B) through an elastic force of the elastic arm 134. In this embodiment, the positioning part 136 is, for example, a roller and is sleeved on an end of the elastic arm 134 to be able to roll when taking the elastic arm 134 as a rotating shaft.

Figure 7:
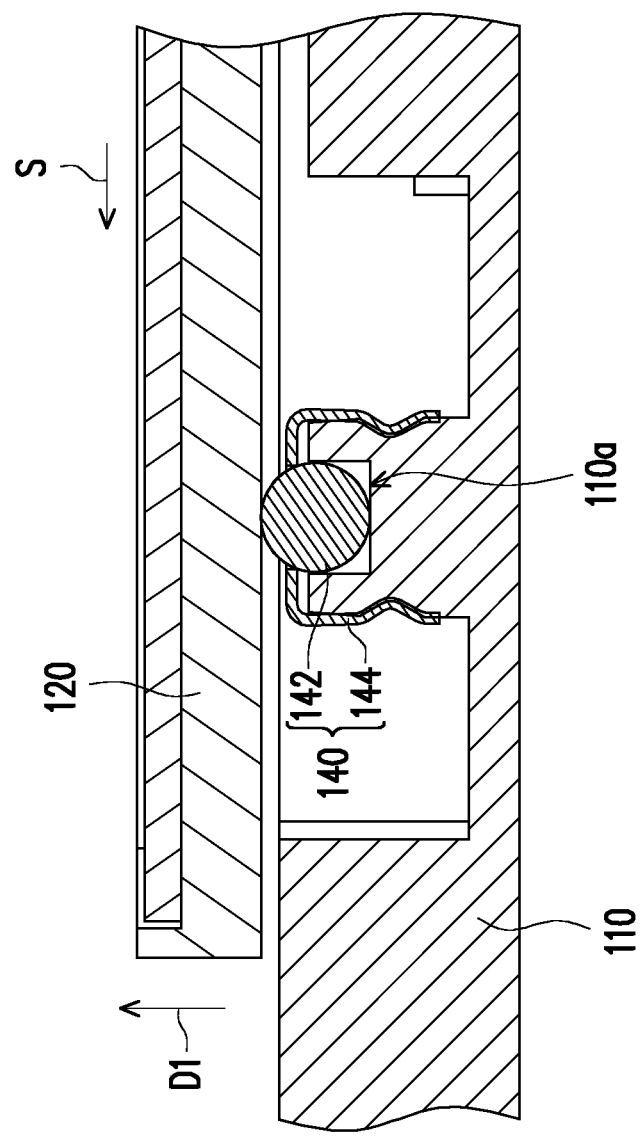
FIG. 7 is a partial enlarged view of the electronic device of FIG. 3B.

FIG. 7 is a partial enlarged view of the electronic device of FIG. 3B. With reference to FIG. 3B, FIG. 5, and FIG. 7, the electronic device 100 in this embodiment further includes at least one prop assembly 140. The prop assembly 140 is disposed on the body 110 and is adapted to prop the functional assembly 120 along the direction D1 perpendicular to the sliding direction S. That is, in this embodiment, not only the elastic positioning assembly 130 is employed to prop the functional assembly 120, but the prop assembly 140 is also employed to prop the functional assembly 120, so that the functional assembly 120 slides along the body 110 more stably. To be specific, the prop assembly 140 may include a rolling ball 142 and a limiting part 144. The limiting part 144 is connected to the body 110 and limits a position of the rolling ball 142 to a groove 110a of the body 110.

Figure 8:
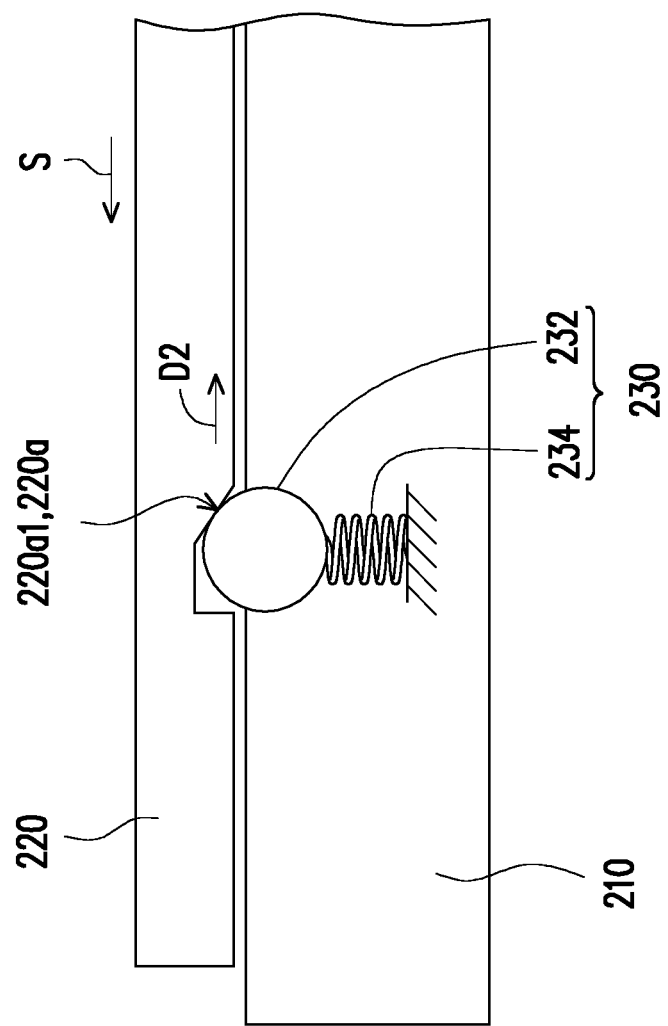
FIG. 8 is a partial schematic view of an electronic device according to another embodiment of the disclosure.

The disclosure does limit the form of the elastic positioning assembly or the positioning concave portion, which will be described hereinafter with the drawings. FIG. 8 is a partial schematic view of an electronic device according to another embodiment of the disclosure. The difference between the embodiment as shown in FIG. 8 and the embodiment as shown in FIG. 4 is as follows. In FIG. 8, an elastic positioning assembly 230 includes an elastic part 234 and a positioning part 232. The elastic part 234 is, for example, a spring and is compressibly connected between a body 210 and the positioning part 232. The positioning part 232 is adapted to abut against a functional assembly 220 through an elastic force of the elastic part 234. A positioning concave portion 220a of the functional assembly 220 has an inclined inner wall 220a1, and the inclined inner wall 220a1 is inclined with respect to a sliding direction S of the functional assembly 220. Specifically, an inclination angle of the inclined inner wall 220a1 with respect to the sliding direction S may be 30-90 degrees. When the functional assembly 220 is located at a predetermined position as shown in FIG. 8, the elastic positioning assembly 230 abuts against the inclined inner wall 220a1. Thereby, a force acted on the inclined inner wall 220a1 by the elastic positioning assembly 230 positioned at the positioning concave portion 220a includes a component parallel to the sliding direction S, thereby providing a positioning force to the functional assembly 220 along a direction D2 parallel to the sliding direction S. Accordingly, the functional assembly 220 is reliably positioned in the absence of an unexpected inclination or deviation in the sliding direction S.

In summary of the foregoing, in the disclosure, the elastic positioning assembly is disposed on the body of the electronic device, so that through propping the functional assembly by the elastic positioning assembly, a gap is formed between the functional assembly and the body. Thereby, it can be prevented that the functional assembly does not slide smoothly due to the friction with the body during the process where the functional assembly slides along the body. Also, the elastic positioning assembly, through the elastic deformation thereof, absorbs the assembly tolerances between the components, which accordingly prevents that the functional assembly propped by the elastic positioning assembly cannot slide smoothly due to the assembly tolerances. In addition, when the functional assembly slides to the predetermined place, the functional assembly is positioned by the elastic positioning assembly through its provided positioning force parallel to the sliding direction. Accordingly, the functional assembly is reliably positioned in the absence of an unexpected inclination or deviation in the sliding direction.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. An electronic device, comprising:
   at least one body;
   at least one functional assembly slidably disposed on the at least one body along a sliding direction; and
   at least one elastic positioning assembly disposed on the at least one body and adapted to prop the at least one functional assembly along a direction perpendicular to the sliding direction such that a gap is formed between the at least one functional assembly and the at least one body, wherein when the at least one functional assembly slides to a predetermined position with respect to the at least one body, the at least one elastic positioning assembly provides a positioning force to the at least one functional assembly along a direction parallel to the sliding direction, wherein the at least one functional assembly has at least one positioning concave portion, the at least one positioning concave portion faces toward the at least one body, and when the at least one functional assembly is located at the predetermined position, the at least one elastic positioning assembly is positioned at the at least one positioning concave portion, wherein the at least one elastic positioning assembly has a convex curved surface, the at least one positioning concave portion has a concave curved surface, and the convex curved surface is adapted to contact the concave curved surface.

2. The electronic device according to claim 1, wherein the number of the at least one body is two, the two bodies are pivotally connected to each other, the number of the at least one functional assembly is two, and the two functional assemblies respectively correspond to the two bodies.

3. The electronic device according to claim 2, wherein each of the functional assemblies is adapted to slide along the corresponding body as the two bodies pivotally rotate with respect to each other.

4. The electronic device according to claim 2, wherein when the two functional assemblies become coplanar as the two bodies expand with respect to each other and when each of the functional assemblies is located at the predetermined position, an edge of each of the functional assemblies abuts against an edge of the other functional assembly.

5. The electronic device according to claim 1, wherein when the at least one functional assembly is located at the predetermined position, a curvature center of the convex curved surface deviates from a curvature center of the concave curved surface in the sliding direction.

6. The electronic device according to claim 1, wherein a curvature radius of the concave curved surface is 0.7-2 times a curvature radius of the convex curved surface.

7. The electronic device according to claim 1, wherein the at least one positioning concave portion has an inclined inner wall, the inclined inner wall is inclined with respect to the sliding direction, and when the at least one functional assembly is located at the predetermined position, the at least one elastic positioning assembly abuts against the inclined inner wall.

8. The electronic device according to claim 7, wherein an inclination angle of the inclined inner wall with respect to the sliding direction is 30-90 degrees.

9. The electronic device according to claim 1, wherein the at least one elastic positioning assembly comprises a bracket, an elastic arm, and a positioning part, the bracket is connected to the at least one body, the elastic arm is connected between the bracket and the positioning part, and the positioning part is adapted to abut against the at least one functional assembly through an elastic force of the elastic arm.

10. The electronic device according to claim 9, wherein the positioning part is a roller, and the roller is sleeved on the elastic arm and takes the elastic arm as a rotating shaft.

11. The electronic device according to claim 1, the at least one elastic positioning assembly comprises an elastic part and a positioning part, the elastic part is compressibly connected between the at least one body and the positioning part, and the positioning part is adapted to abut against the at least one functional assembly through an elastic force of the elastic part.

12. The electronic device according to claim 1, further comprising at least one prop assembly, wherein the at least one prop assembly is disposed on the at least one body and is adapted to prop the at least one functional assembly along the direction perpendicular to the sliding direction.

13. The electronic device according to claim 12, wherein the at least one prop assembly comprises a rolling ball and a limiting part, and the limiting part is connected to the at least one body and limits a position of the rolling ball to the at least one body.

* * * * *